United States Patent [19]
Harkrader et al.

[11] Patent Number: 6,102,416
[45] Date of Patent: Aug. 15, 2000

[54] MOUNT FOR RACK AND PINION STEERING GEAR

[75] Inventors: Ronald L. Harkrader, Clarkston; Richard E. Jayroe, Rochester Hills; Stephan A. Stearns, Holly; Paula L. Payne, Rochester Hills, all of Mich.

[73] Assignee: General Motors Corporation, Detroit, Mich.

[21] Appl. No.: 09/102,504

[22] Filed: Jun. 22, 1998

[51] Int. Cl.[7] ....................................... B62D 3/12
[52] U.S. Cl. ................... 280/93.515; 280/93.51; 280/93.514; 280/771
[58] Field of Search .............. 280/771, 93.502, 280/93.51, 93.515, 93.512, 93.514, FOR 107

[56] References Cited

U.S. PATENT DOCUMENTS

| | | | |
|---|---|---|---|
| 3,632,127 | 1/1972 | Grosseau | 280/96 |
| 3,869,139 | 3/1975 | Gage | 280/96 |
| 3,958,462 | 5/1976 | Matschinsky et al. | 74/498 |
| 4,314,710 | 2/1982 | Kamoshita et al. | 280/96 |
| 4,531,426 | 7/1985 | Iijima | 74/498 |
| 5,597,049 | 1/1997 | Bruehl et al. | 180/400 |

*Primary Examiner*—Eric Culbreth
*Attorney, Agent, or Firm*—Edmund P. Anderson

[57] ABSTRACT

A mount for a rack and pinion steering gear on a body structure of a motor vehicle including a horizontal tubular boss on the steering gear parallel to a longitudinal centerline of the body structure, a tubular sleeve rigidly clamped to the body structure inside of the tubular boss having a pair of rigid flanges at opposite ends thereof, and an elastomeric bushing on the tubular sleeve between the rigid flanges. The elastomeric bushing has a tubular body bonded to the tubular sleeve and a plurality of integral linear splines compressed radially between the tubular sleeve and an inside cylindrical wall of the tubular boss. The linear splines flex resiliently to suppress the transfer of linear vibrations from the steering gear to the body structure. The angular separation between the linear splines controls the stiffness or reaction rate of the mount in a plurality of directions perpendicular to a longitudinal centerline of the tubular boss so that the mount can be constructed with relatively more compliance in directions which yield positive vehicle performance characteristics.

3 Claims, 2 Drawing Sheets

MOUNT FOR RACK AND PINION STEERING GEAR

TECHNICAL FIELD

This invention relates to a mount for a rack and pinion steering gear on a body structure of a motor vehicle.

BACKGROUND OF THE INVENTION

A motor vehicle typically includes a pair of steering knuckles supported on a body structure of the motor vehicle for vertical suspension excursions and for pivotal movement about a pair of steering axes and a pair of dirigible wheels rotatably mounted on the steering knuckles. A motor vehicle rack and pinion steering system typically includes a rack and pinion steering gear mounted on the body structure and a pair of tie rods between the steering gear and the steering knuckles. A motor vehicle integral gear steering system includes an integral steering gear on the body structure and a drag link between the steering gear and the tie rods. The integral gear steering system has greater mass than the rack and pinion steering system but relatively greater compliance due to dimensional clearances in the pivotal connections between the additional structural elements. The integral gear steering system has been observed to be more suitable for a motor vehicle subject to a wide range of loads, e.g. a truck, than a rack and pinion steering system unless complex and expensive structure is provided to account for the reduced compliance of the rack and pinion steering system relative to the integral gear steering system.

SUMMARY OF THE INVENTION

This invention is a new and improved mount for a rack and pinion steering gear on a body structure of a motor vehicle including a horizontal tubular boss on a housing of the steering gear parallel to a longitudinal centerline of the body structure, a tubular sleeve rigidly clamped to the body structure inside of the tubular boss having a pair of rigid flanges at opposite ends thereof, and an elastomeric bushing on the tubular sleeve between the rigid flanges. The elastomeric bushing has a tubular body bonded to the tubular sleeve and a plurality of integral linear splines compressed radially between the tubular sleeve and an inside cylindrical wall of the tubular boss. The linear splines flex resiliently to suppress the transfer of linear vibrations from the steering gear to the body structure. The angular separation between the linear splines around the tubular body of the bushing controls the stiffness or reaction rate of the mount in a plurality of directions perpendicular to a longitudinal centerline of the tubular boss so that the mount can be constructed with relatively more compliance in directions which yield positive vehicle performance characteristics. The mount according to this invention affords a motor vehicle manufacturer the opportunity to incorporate a rack and pinion steering system in a motor vehicle subject to a wide range of loads without resort to expensive and complex structure to account for the reduced compliance of the rack and pinion steering system relative to an integral gear steering system.

DESCRIPTION OF THE PREFERRED EMBODIMENT

Figure 1:
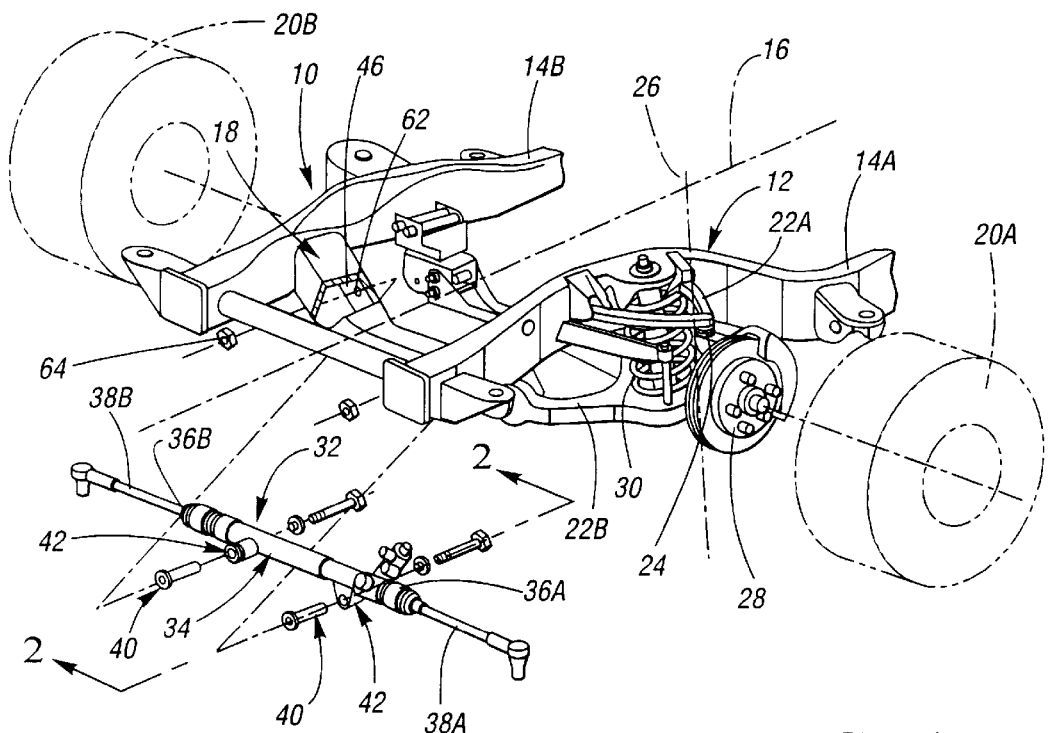
FIG. 1 is a fragmentary perspective view of a motor vehicle body structure having a rack and pinion steering gear supported thereon by a plurality of mounts according to this invention.
Figure 2:
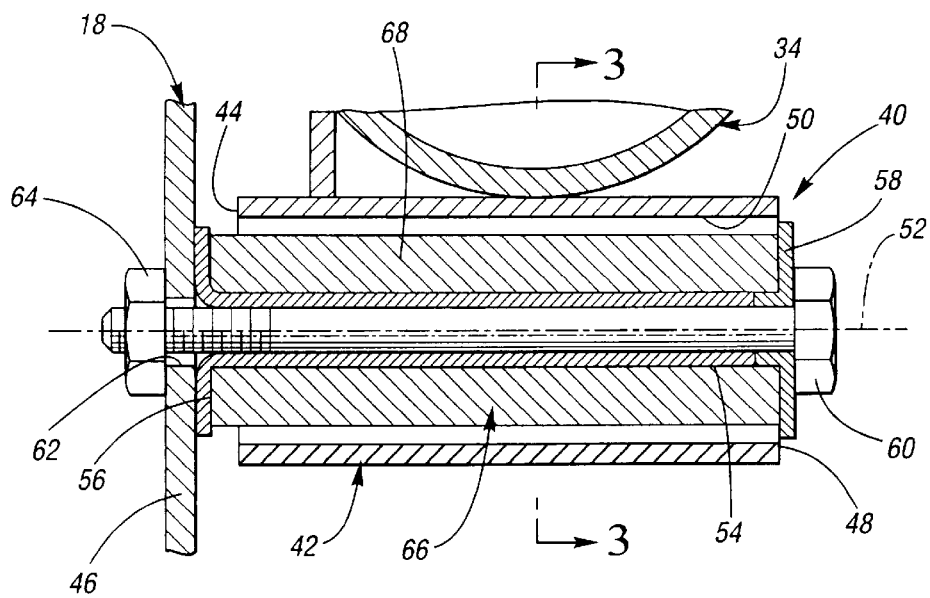
FIG. 2 is an enlarged sectional view taken generally along the plane indicated by lines 2—2 in FIG. 1.
Figure 3:
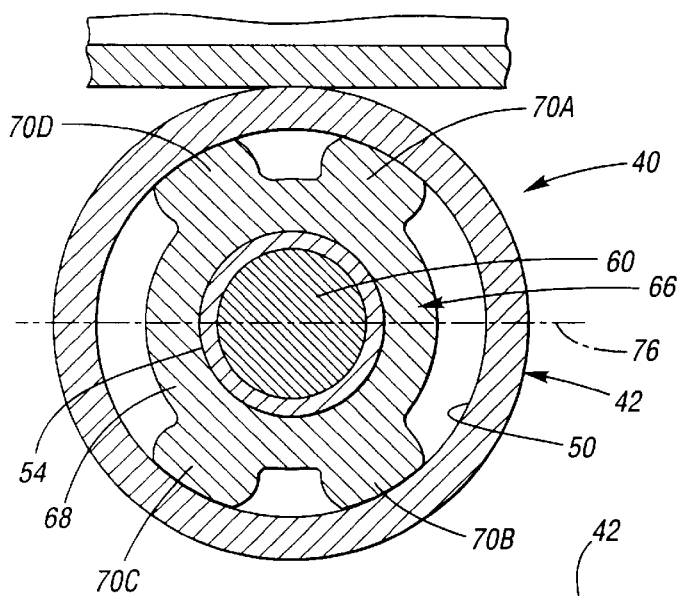
FIG. 3 is a sectional view taken generally along the plane indicated by lines 3—3 in FIG. 2.
Figure 4:
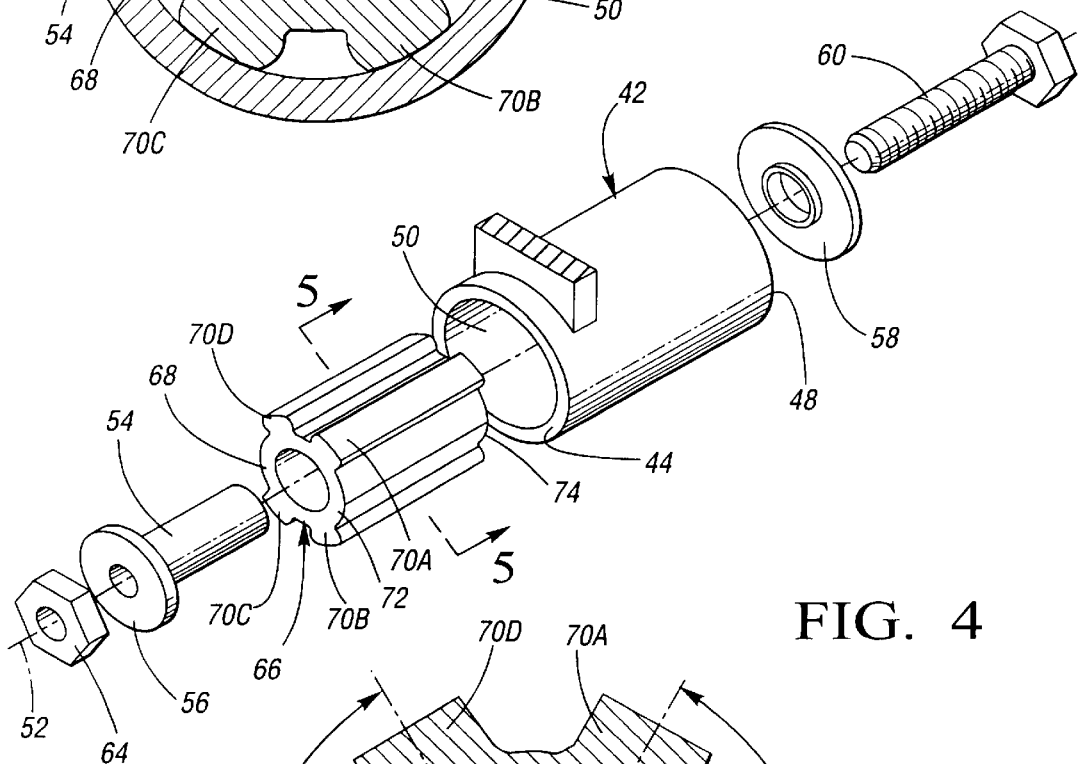
FIG. 4 is an exploded perspective view of the mount according to this invention.
Figure 5:
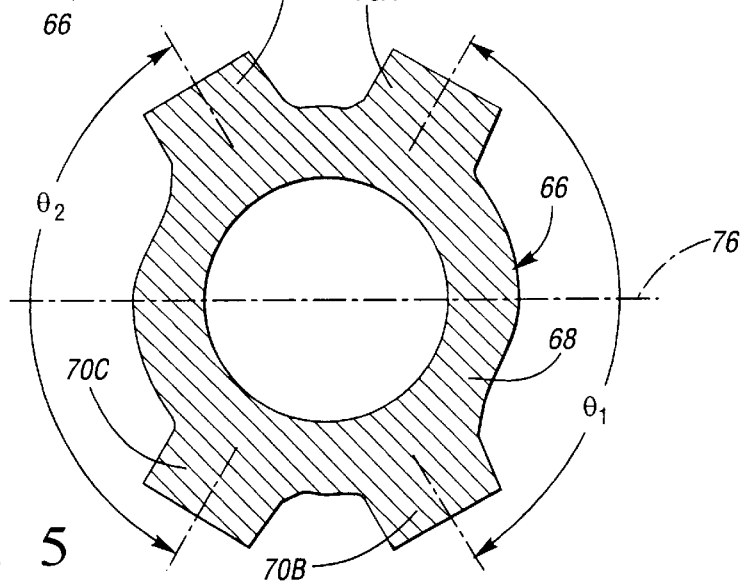
FIG. 5 is an enlarged sectional view taken generally along the plane indicated by lines 5—5 in FIG. 4.

Referring to FIG. 1, a fragmentarily illustrated body structure 10 of a motor vehicle includes a frame 12 having a pair of side rails 14A, 14B generally parallel to a longitudinal centerline 16 of the body structure and a rigid cross member 18 between the rails. The body structure is suspended on a schematically represented pair of steerable dirigible wheels 20A,20B by a front suspension system including, on the left side of the body structure looking forward, a pair of control arms 22A,22B supported on the rail 14A for vertical pivotal movement and a steering knuckle 24 connected to the outboard ends of the control arms for vertical suspension excursions and for pivotal movement about a steering axis 26. The steerable dirigible wheel 20A is rigidly connected to a hub or rotor 28 rotatably supported on the steering knuckle 24. A spring 30 is disposed between the frame 12 and the lower control arm 22B. The front suspension system on the right side of the body structure, not shown, is a mirror image of the suspension system on the left side of the body structure.

A rack and pinion steering gear 32, FIG. 1, includes an elongated tubular housing 34 having a rack bar, not shown, supported therein for horizontal back and forth linear translation perpendicular to the longitudinal centerline 16 of the body structure. Opposite ends, not shown, of the rack bar protrude beyond corresponding ends of the tubular housing 34 and are shrouded by a pair of flexible boots 36A,36B attached to the housing. A pair of tie rods 38A,38B are connected to respective ends of the rack bar inside of the boots 36A,36B and to respective ones of the steering knuckles 24 of the front suspension system. The tie rods 38A,38B are offset from the steering axes 26 so that back and forth linear translation of the rack bar induces concurrent pivotal movement of the steering knuckles around the steering axes.

A pinion gear, not shown, connected to a steering hand wheel, not shown, of the motor vehicle is rotatably supported in the housing 34 and meshes with a rack gear on the rack bar. The pinion gear induces back and forth linear translation of the rack bar concurrent with rotation of the steering hand wheel in conventional fashion. The rack and pinion steering gear 32 is mounted on the cross member 18 of the frame 12 of the body structure 10 by a pair of laterally separated mounts 40 according to this invention.

Referring to FIGS. 1–5 and describing only one of the mounts 40 according to this invention, the latter includes a tubular boss 42 welded, integral with, or otherwise rigidly attached to the tubular housing 34 below the rack bar. The tubular boss 42 has a first end 44 facing a schematically represented vertical panel 46 of the frame cross member 18, FIGS. 1–2, a second end 48 opposite the first end, and an inside cylindrical wall 50 symmetric with respect to a longitudinal centerline 52 of the tubular boss parallel to the longitudinal centerline 16 of the body structure.

A tubular sleeve 54 of the mount 40 is disposed inside of the tubular boss 42 and has an integral flange 56 at a first end thereof and an annular washer 58 at a second end thereof defining a second flange on the tubular sleeve opposite the flange 56. A bolt 60 traverses the tubular sleeve and the washer and an aperture 62 in the vertical panel 46 of the frame cross member and cooperates with a nut 64 on the other side of the panel in rigidly clamping the tubular sleeve of the mount to the frame 12 of the body structure with the flange 56 seated against the panel 46. The diameters of the flange 56 and the washer 58 are less than the diameter of the inside cylindrical wall 50 of the tubular boss to avoid interference with the ends 44,48 of the tubular boss.

An elastomeric bushing 66 of the mount 40 is disposed in the annulus defined between the sleeve 54 and the inside cylindrical wall 50 of the tubular boss and includes a tubular body 68 around and adhesively bonded to the sleeve and a plurality of linear splines 70A,70B,70C,70D projecting radially from the tubular body. Each of the linear splines 70A–70D extends the full length of the bushing parallel to the longitudinal centerline 52 of the tubular boss between a first end 72 of the bushing and a second end 74 thereof. The linear splines 70A–70B and 70C–70D are separated around the tubular body 68 by respective ones of a pair of separation angles $\theta_1,\theta_2$, FIG. 5, each bisected by a horizontal centerplane 76 of the mount 40. The linear splines 70A–70D are resiliently compressed radially between the inside cylindrical wall 50 of the tubular boss 42 and the tubular sleeve 54. The first and the second ends 72,74 of the bushing are captured between the flange 56 and the washer 58 on the tubular sleeve.

The linear splines 70A–70D cooperate in resiliently suspending the tubular boss 42 of each mount 40 on the sleeve 54 of the mount with directionally variable compliance perpendicular to the longitudinal centerline 52 of the tubular boss. That is, as the separation angles $\theta_1,\theta_2$ become smaller, the linear splines more stiffly resist forces directed horizontally perpendicular to the longitudinal centerline 52 than vertically perpendicular to the longitudinal centerline 52 and vice versa. Because the ends 72,74 of the bushing 66 are closely captured between the flange 56 and the washer 58 on the sleeve 54, the bushing is substantially rigid in the direction of the longitudinal centerline 52.

During operation of the motor vehicle, force reactions between the dirigible wheels and the road surface torsionally vibrate the steering knuckles 24 about their respective steering axes 26 and induce corresponding linear vibration of the tie rods 38A,38B and of the steering gear housing 34. Such linear vibrations of the steering gear housing induce resilient radial flexure of the linear splines 70A–70D on the bushings 66 which damps the vibrations and suppresses their transfer to the body structure 10. At the same time, force reactions between the dirigible wheels and the road surface also induce relatively more sustained turning moments on the steering knuckles 24 about their respective steering axes 26 which, in turn, induce more sustained tension and compression in the tie rods 38A,38B and in the steering gear housing 34 and more sustained resilient radial flexure of the linear splines 70A–70D on the bushings 66. The directions of the resultant force vectors of such sustained tension and compression reactions through the mounts 40 change as the body structure 10 becomes more heavily loaded and its vertical position relative to the steering knuckles 24 changes. The separation angles $\theta_1,\theta_2$ are calculated to yield vertical and horizontal compliance of the mounts 40 perpendicular to the centerlines 52 of the tubular bosses 42 which optimize performance characteristics of the motor vehicle such as understeer, steering sensitivity, linear range, roll gradient, lateral acceleration response, and pitch gradient and damping throughout the load range of the motor vehicle.

The linear splines 70A–70D on the bushing 66 constitute an important feature of this invention because they are easily formed by an economical process of extruding the elastomer from which the bushing is made through a die having the same shape in cross section as the bushing. In addition, such extrusion dies can be relatively easily and economically modified to change the separation angle $\theta_1,\theta_2$ between the linear splines and the corresponding lateral compliance of the mount for different motor vehicle models.

Having thus described the invention, what is claimed is:

1. A mount between a rack and pinion steering gear and a body structure of a motor vehicle comprising:

a tubular boss on said rack and pinion steering gear having a longitudinal centerline parallel to a longitudinal centerline of said body structure, a tubular sleeve, an annular first flange at a first end of said tubular sleeve, an annular second flange at a second end of said tubular sleeve, a fastener rigidly clamping said tubular sleeve to said body structure inside of said tubular boss so that said tubular sleeve cooperates with an inside cylindrical wall of said tubular boss in defining an annulus therebetween, and an elastomeric bushing in said annulus between said tubular sleeve and said inside cylindrical wall of said tubular boss having a body bonded to said tubular sleeve and a first end and a second end captured between said annular first flange and said annular second flange at said first end and said second end of said tubular sleeve and a plurality of integral linear splines protruding radially from said body and compressed between said tubular sleeve and said inside cylindrical wall of said tubular boss, said linear splines being separated around said body of said bushing by a plurality of separation angles and cooperating in resiliently suspending said rack and pinion steering gear on said tubular sleeve with vertical and horizontal resilient compliance perpendicular to said longitudinal centerline of said tubular boss determined by the magnitudes of said separation angles.

2. The mount between a rack and pinion steering gear and a body structure of a motor vehicle recited in claim 1 wherein:

each of said plurality of linear splines on said tubular body of said elastomeric bushing extends the full length of said elastomeric bushing between said first end thereof and said second end thereof.

3. The mount between a rack and pinion steering gear and a body structure of a motor vehicle recited in claim 2 wherein:

said plurality of linear splines protruding radially from said body of said elastomeric bushing and compressed between said tubular sleeve and said inside cylindrical wall of said tubular boss comprises a plurality of four linear splines arrayed symmetrically on opposite sides of a horizontal centerplane of said mount.

* * * * *